United States Patent
Knepler

(10) Patent No.: US 6,479,086 B1
(45) Date of Patent: Nov. 12, 2002

(54) DISPENSER-MAKER INTERFACE AND METHOD OF USE

(75) Inventor: John T. Knepler, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 0 days.

(21) Appl. No.: 09/550,470

(22) Filed: Apr. 14, 2000

Related U.S. Application Data

(63) Continuation-in-part of application No. 09/472,367, filed on Dec. 23, 1999, which is a continuation-in-part of application No. 09/337,102, filed on Jun. 21, 1999, now Pat. No. 6,238,721.

(51) Int. Cl.[7] .............................. A23L 2/00; G01N 33/02
(52) U.S. Cl. ...................... 426/231; 99/280; 99/289 R; 99/323; 426/433; 426/590
(58) Field of Search ................... 426/231, 433, 426/435, 590; 99/280, 282, 283, 285, 289 R, 323

(56) References Cited

U.S. PATENT DOCUMENTS

| | | | |
|---|---|---|---|
| 3,423,209 A | 1/1969 | Weber | 99/71 |
| 4,468,406 A | 8/1984 | d'Alayer de Costemore d'Arc | 426/231 |
| 5,072,660 A | 12/1991 | Helbling | 99/280 |
| 5,094,153 A | 3/1992 | Helbling | 99/280 |
| 5,158,793 A | 10/1992 | Helbling | 426/231 |
| 5,186,399 A | 2/1993 | Knepler et al. | 99/286 |
| 5,375,508 A | 12/1994 | Knepler et al. | 99/280 |
| 5,417,145 A | 5/1995 | Joseph, Jr. et al. | 99/280 |
| 5,511,465 A | 4/1996 | Friedrich et al. | 99/286 |
| 5,542,342 A | 8/1996 | McNeill et al. | 99/280 |
| 5,568,763 A | 10/1996 | Kunzler | 99/280 |
| 5,724,882 A | 3/1998 | Gallas et al. | 99/285 |
| 5,858,437 A | * 1/1999 | Anson | 426/435 |
| 6,067,894 A | * 5/2000 | Eugster | 99/280 |

OTHER PUBLICATIONS

Optek Technology, Inc , Product Bulletin OHN3506/3507, Ratiometric Linear Hall Effect Sensor, Aug. 1996.

Dallas Semiconductor DS1971 256–Bit EEPROM iButton™ pp. 1–3 082299.

Dallas Semiconductor DS1973 4K–Bit EEPROM iButton™ pp. 1–2 062498 1/2.

Dallas Semiconductor A Personal Touch for the Information Age pp. 1–3.

TEMIC Semiconductors TK5550 Read/Write Transponder, TELEFUNKEN Semiconductors Rev. A1, Apr. 30, 1997, pp. 304, 305 and 311.

TEMIC Semiconductors Identification Systems, TELE-FUNKEN Semiconductors 08.97, pp. 225–228.

* cited by examiner

Primary Examiner—George C. Yeung
(74) Attorney, Agent, or Firm—Barnes & Thornburg

(57) ABSTRACT

An interface for a beverage dispenser, a maker and a funnel and its method of use is provided. The dispenser has a structure therein for storing and transmitting information and a user interface coupled thereto. The funnel includes a body and a memory device therein. The maker includes structure for reading the memory device of the funnel. When the funnel is mounted on the dispenser, the structure in the dispenser and the memory device of the funnel are in communication with each other so that information input into the dispenser by a user is transmitted to the funnel. The appropriate beverage is dispensed into the funnel. Thereafter, when the funnel is mounted on the maker, the structure in the maker and the memory device of the funnel are in communication with each other and the structure in the maker reads the information stored in the memory device of the funnel so that the desired beverage can be produced.

14 Claims, 7 Drawing Sheets

FIG. 3
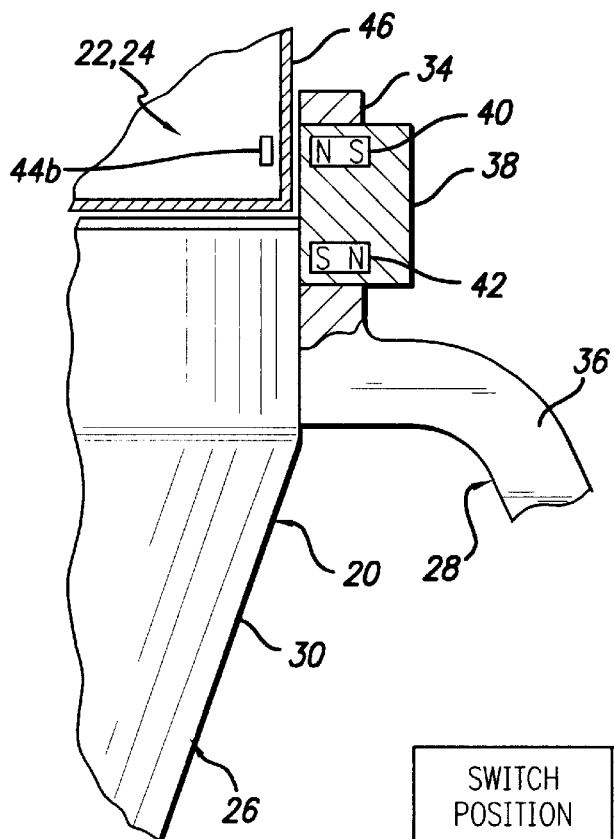
FIG. 4
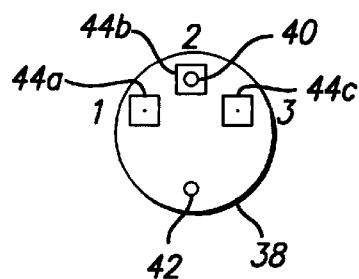
FIG. 5
| SWITCH POSITION | | SENSOR | | |
|---|---|---|---|---|
| | | 1 | 2 | 3 |
| REG | SMALL | + | 0 | 0 |
| | MED. | 0 | + | 0 |
| | LARGE | 0 | 0 | + |
| DECAF. | S | − | 0 | 0 |
| | M | 0 | − | 0 |
| | L | 0 | 0 | − |
0 VOLTAGE WITH NO MAGNET
− NEGATIVE GOING
+ POSITIVE GOING
OUTPUT CHART
FIG. 6
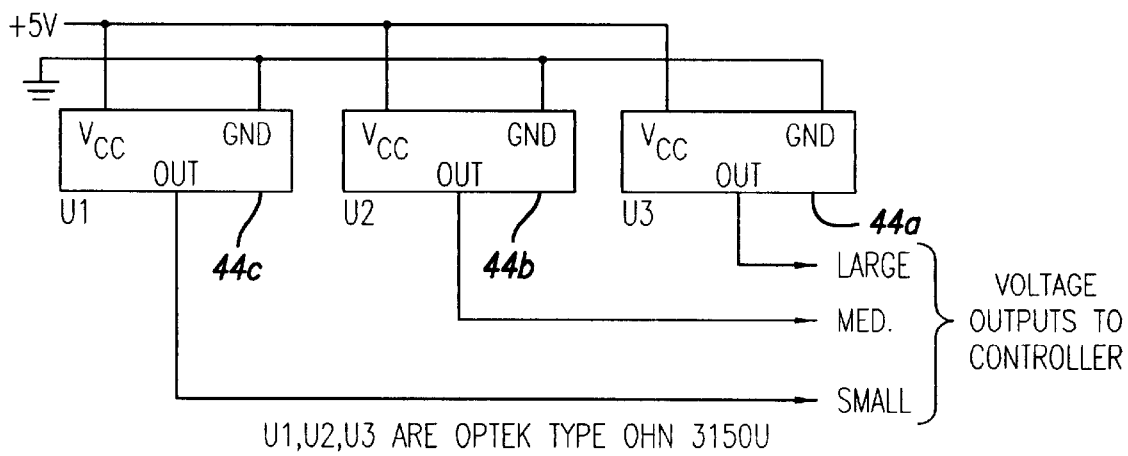

FIG. 9
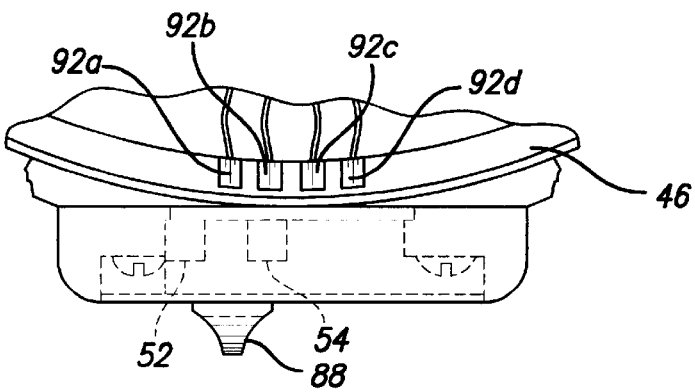
FIG. 10
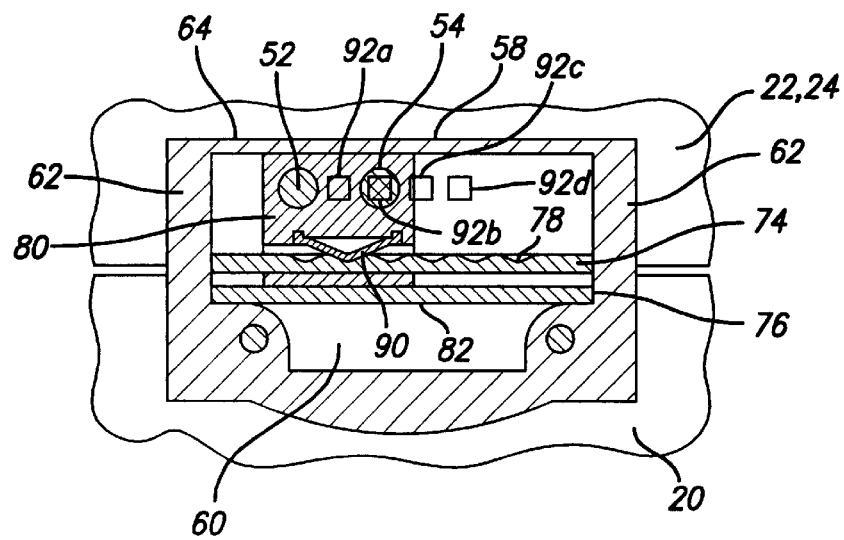
FIG. 11
0 = VOLTAGE WITH NO MAGNET
− NEGATIVE GOING
+ POSITIVE GOING
| SWITCH POSITION | | | SENSOR | | | |
|---|---|---|---|---|---|---|
| | | | 1 | 2 | 3 | 4 |
| R E G U L A R | SMALL | 1 | + | 0 | 0 | 0 |
| | MEDIUM | 2 | 0 | + | 0 | 0 |
| | LARGE | 3 | − | 0 | + | 0 |
| D E C A F | SMALL | 4 | 0 | − | 0 | + |
| | MEDIUM | 5 | 0 | 0 | − | 0 |
| | LARGE | 6 | 0 | 0 | 0 | − |

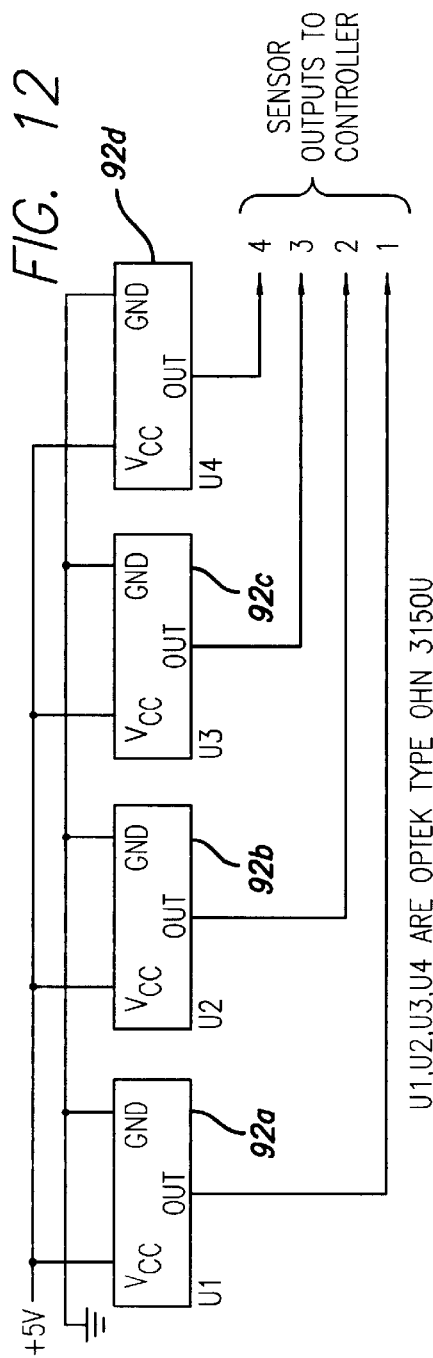
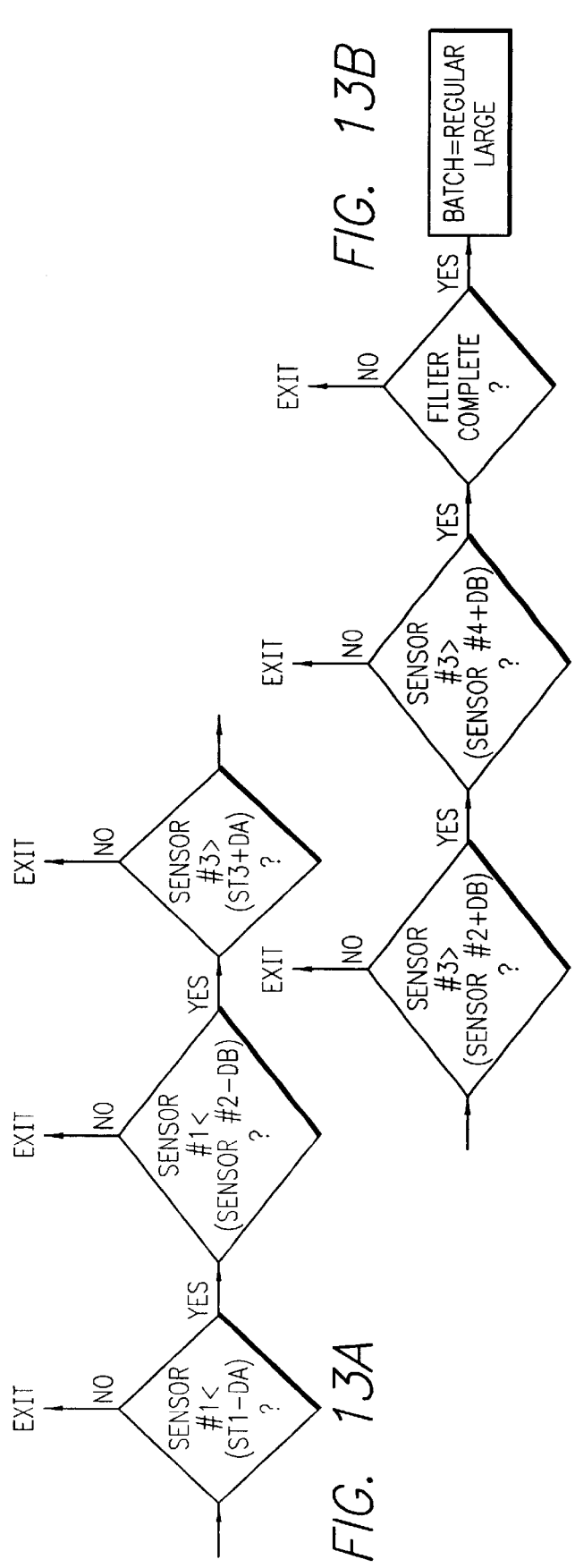

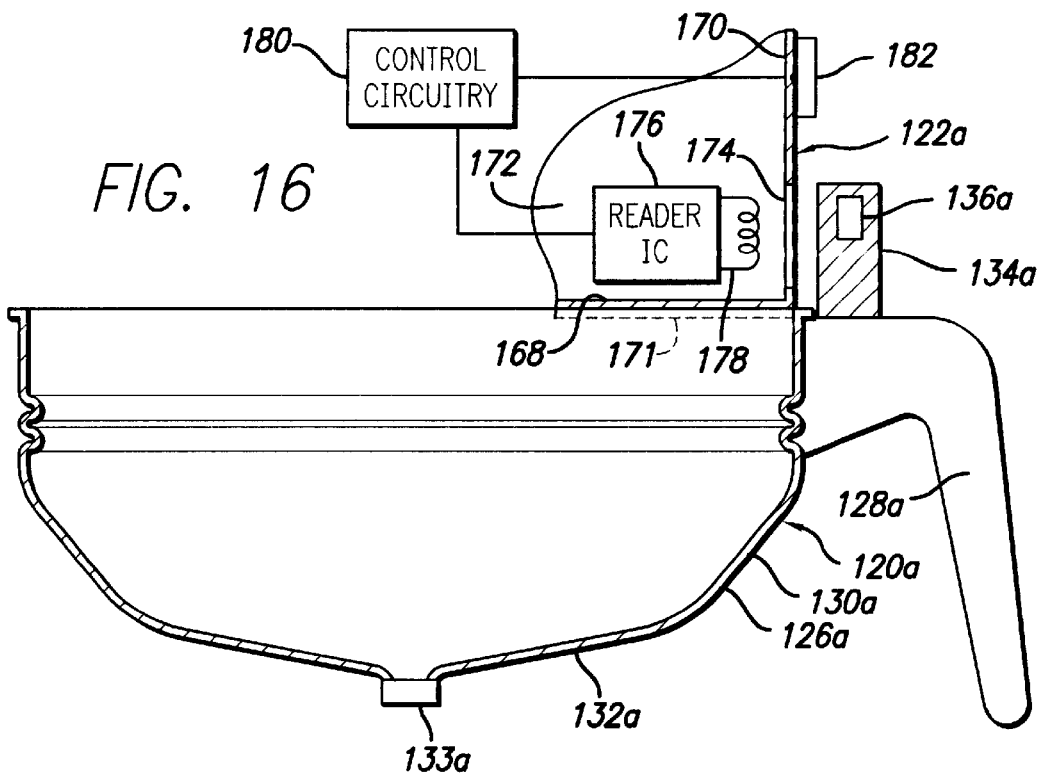
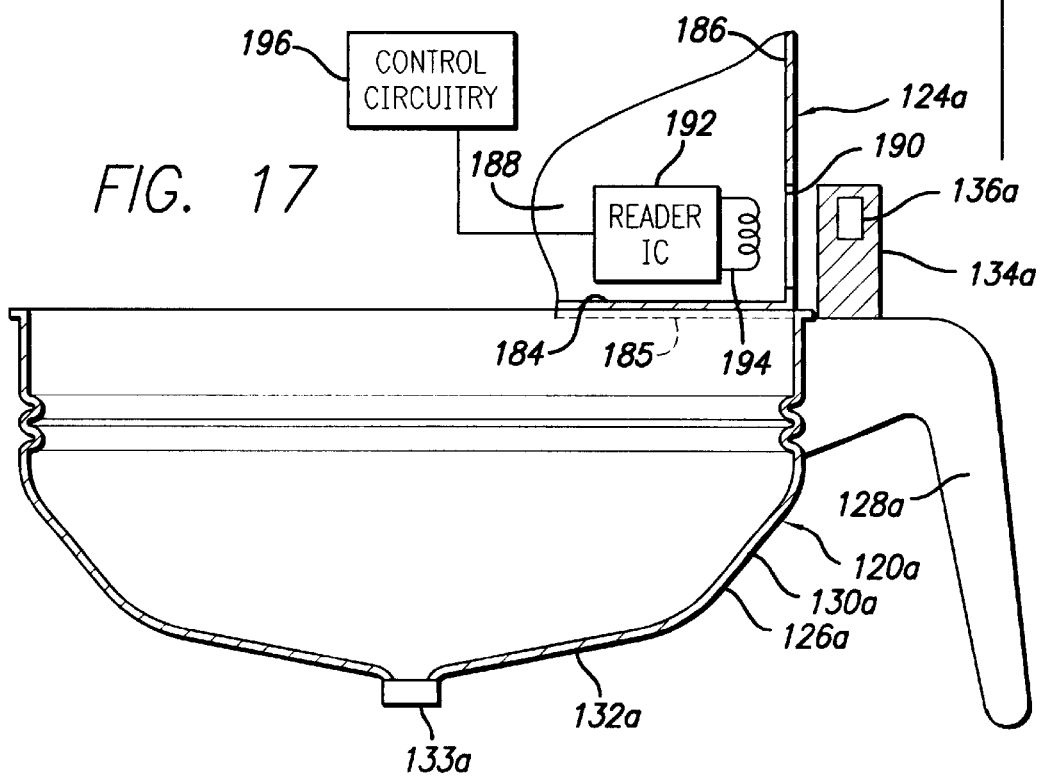

DISPENSER-MAKER INTERFACE AND METHOD OF USE

CROSS-REFERENCE

This application is a continuation-in-part application of the U.S. patent application Ser. No. 09/472,367, filed on Dec. 23, 1999 and entitled "Wireless Grinder-Brewer Interface and Method of Use", which is a continuation in part application of U.S. application Ser. No. 09/337,102, filed on Jun. 21, 1999, now U.S. Pat. No. 6,238,721, entitled "Wireless Grinder-Brewer Interface and Method of Use."

BACKGROUND OF THE INVENTION

This invention is generally directed to a novel beverage substance dispenser, beverage maker or brewer and funnel interface and its method of use. More particularly, the invention contemplates a novel interface which utilizes a funnel which can be mounted on either a brewing substance dispenser, such as a coffee grinder, or a beverage maker, such as a coffee brewer, to communicate information regarding beverage batch size and/or type of beverage from the brewing substance dispenser to the beverage maker.

U.S. Pat. No. 5,186,399, which identifies the same assignee as the present application, describes a system of connecting a multiple batch size brewer and a dual hopper grinder in order to coordinate the amount of ground coffee with the selected brewing volume. This system might not be explicit regarding setting the switches on the coffee grinder and on the coffee brewer to achieve the desired results and confusion may result. This confusion may occur if the user is preoccupied or busy. Also, this system is complicated when a dual head coffee brewer is used with a dual hopper coffee grinder, and when a single coffee grinder services more than one coffee brewer. In addition, the grinding operation is generally much faster than a brewing cycle (seconds versus minutes). Consequently, it is feasible for one coffee grinder to service several coffee brewers. Due to the complexity and expense of the switching and interconnect cables, however, a maximum of two coffee brewers are used with the system disclosed in U.S. Pat. No. 5,186,399.

The parent and grandparent applications, U.S. patent application Ser. No. 09/472,367 and U.S. Pat. No. 6,238,721 which are assigned to the same assignee as the present application, disclose a wireless grinder-brewer interface and its method of use. A selector on the funnel is set by a user to select beverage batch size and type. This information is wirelessly communicated to the grinder and to the brewer when the funnel is mounted thereon. When this type of system is used, it is possible for a user to unitentionally move the selector when the funnel is being moved from the grinder to the brewer, such that the information communicated to the brewer is incorrect.

The present invention provides a novel interface and method which overcomes the limitations found in the system disclosed in U.S. Pat. No. 5,186,399 and in the parent and grandparent applications, U.S. patent applications Ser. Nos. 09/472,367 and 09/337,102. Other features and advantages will become apparent upon a reading of the attached specification, in combination with a study of the drawings.

OBJECTS AND SUMMARY OF THE INVENTION

A general object of the present invention is to provide a novel brewing substance dispenser, beverage maker and funnel interface and its method of use.

An object of the present invention is to provide a novel brewing substance dispenser, beverage maker and funnel interface which utilizes a funnel which can be mounted on the brewing substance dispenser and the beverage maker to communicate information regarding beverage batch size and/or type from the brewing substance dispenser to the beverage maker.

A further object of the present invention is to provide a novel interface and method of use for use with a brewing substance dispenser and a beverage maker to communicate information regarding batch size and/or type of a beverage to be brewed.

Briefly, and in accordance with the foregoing, an embodiment of the present invention discloses an interface for a brewing substance dispenser, a beverage maker and a funnel and its method of use. The brewing substance dispenser has means therein for storing and transmitting information and a user interface coupled thereto. The funnel includes a body and a memory device therein. The beverage maker includes means for reading the memory device of the funnel. When the funnel is mounted on the brewing substance dispenser, the means in the brewing substance dispenser and the memory device of the funnel are in communication with each other so that information input into the beverage maker by a user is transmitted to the funnel. Thereafter, when the funnel is mounted on the beverage maker, the structure in the beverage maker and the memory device of the funnel are in communication with each other and the structure in the beverage maker reads the information stored in the memory device of the funnel so that the desired beverage can be brewed.

Another embodiment of the present invention discloses a funnel having a selector thereon which can be set by a user to indicate a desired beverage batch size and/or type. Sensors on an associated dispenser, such as a coffee grinder, and on an associated beverage maker, such as a coffee brewer, are capable of sensing the structure to dispense, such as by grinding, an appropriate amount of beverage, such as coffee, and to produce, such as by brewing, an appropriate amount of beverage, respectively, when the funnel is mounted thereon.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 3 is a partial fragmentary side elevational view of the funnel shown in FIG. 1, with a fragmentary portion of the funnel being shown in cross-section, and a cross-sectional view of a portion of a machine, such as a brewing substance dispenser or coffee grinder, or a beverage maker or coffee brewer, to which the funnel is attached;

FIG. 4 is a schematic view of the selector on the funnel of FIG. 1 and sensors in the associated machine;

FIG. 5 is an output chart showing voltages generated under various settings for the embodiment of FIGS. 1–4;

FIG. 6 is schematic diagram of the Hall effect sensor circuitry for the embodiment of FIGS. 1–4;

FIG. 9 is a top elevational view of a portion of the funnel and cross-sectional view of a portion of a machine, such as a brewing substance dispenser or coffee grinder, or a beverage maker or coffee brewer, to which the funnel is attached;

FIG. 10 is a cross-sectional view of the funnel and the machine along line 10—10 in FIG. 8;

FIG. 11 is an output chart showing voltages generated under various settings for the embodiment of FIGS. 5–10;

FIG. 12 is schematic diagram of the Hall effect sensor circuitry for the embodiment of FIGS. 5–10; and FIGS. 13A and 13B show a flow chart for detecting a large batch of regular coffee for the embodiment of FIGS. 5–10;

FIG. 16 is a partial fragmentary side elevational view of a funnel, with a fragmentary portion of the funnel being shown in cross-section, and a cross-sectional view of a portion of a brewing substance dispenser, such as a coffee grinder, to which the funnel is attached which incorporates the features of a fourth embodiment of the invention; and FIG. 17 is a partial fragmentary side elevational view of the funnel of FIG. 16, with a fragmentary portion of the funnel being shown in cross-section, and a cross-sectional view of a portion of a beverage maker or brewer, such as a coffee brewer, to which the funnel is attached which incorporates the features of a fourth embodiment of the invention.

DETAILED DESCRIPTION OF THE ILLUSTRATED EMBODIMENT

Figure 1:
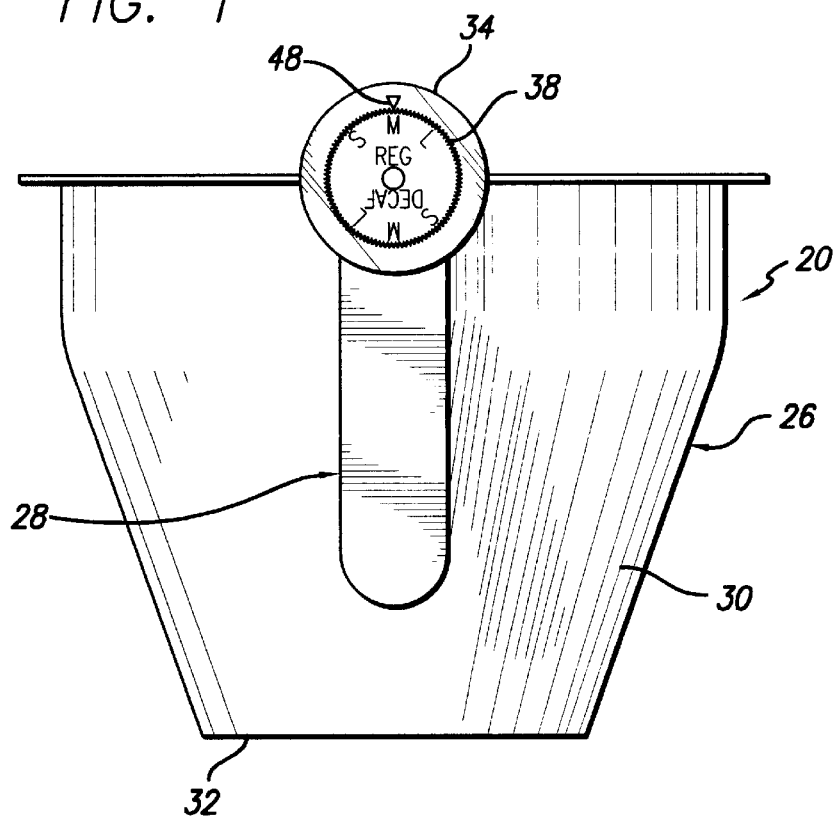
FIG. 1 is a side elevational view of a funnel which incorporates the features of a first embodiment of the invention.
Figure 2:
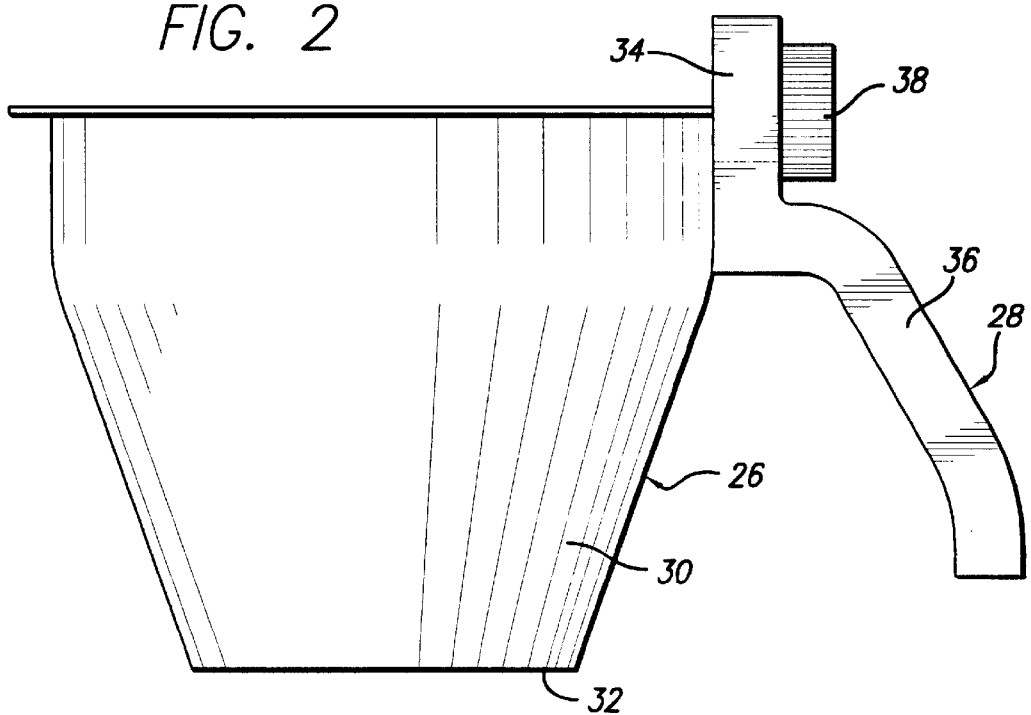
FIG. 2 is a left side elevational view of the funnel shown in FIG. 1.
Figure 8:
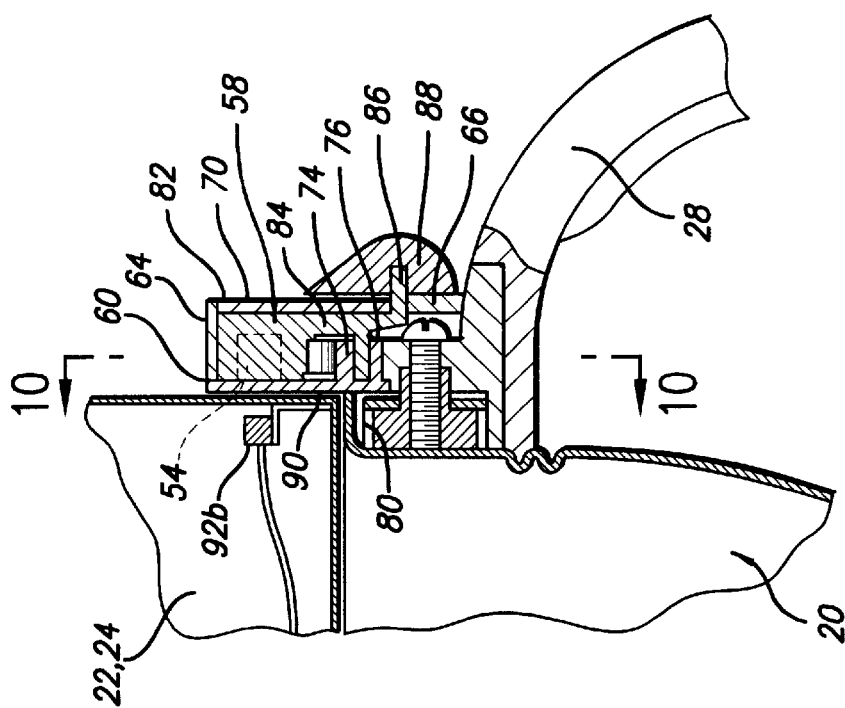
FIG. 8 is a cross-sectional view of the funnel and the machine along line 8—8 in FIG. 7.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The present invention provides a novel brewing substance dispenser, beverage maker and funnel interface and its method of use. The interface is provided by a funnel 20, 120, 120a which can be mounted on a brewing substance dispenser 22, 122, 122a or a beverage maker 24, 124, 124a.

As shown in FIGS. 1–13, the funnel 20 includes a body 26 having a handle 28 mounted thereon. The handle 28 is mounted on the body 26 by conventional means. The body 26 has a side wall 30 which is generally conical and a bottom wall 32 which is generally flat and has an discharge aperture (not shown) therethrough. The upper end of the body 26 is open.

The handle 28 has an upper portion 34 which is aligned with the side wall 30 and a gripping portion 36 which protrudes outwardly from the side wall 30 of the body 26 so that a user can grip the handle 28 and carry the funnel 20. A portion of the upper portion 34 of the handle 28 extends upwardly from the uppermost end of the body 26.

The funnel 20 has a selector 38, 38a thereon which allows a user to select a desired batch size and type of a beverage, such as coffee. Type of beverage may be used to denote regular and decaffeinated coffee, for example, different flavors of the beverage, for example, and the like. As described herein, type of beverage is described as regular and decaffeinated. A first embodiment of the selector 38 is shown in FIGS. 1–6. A second embodiment of the selector 38a is shown in FIGS. 7–13B.

Attention is directed to the first embodiment of the selector 38. As shown in FIGS. 1–4, the selector 38 takes the form of a knob 38 having a pair of imbedded magnets 40, 42. The knob 38 is rotatably mounted on the handle 28 by conventional means. The knob 28 has an upper portion which extends upwardly from the uppermost end of the body 26 and a lower portion which overlaps the upper end of the body 26. The pair of magnets 40, 42 are imbedded within the knob 38 proximate to the side wall 30 of the body 26 and are diametrically opposed to each other on the knob 38. Magnet 40 is mounted such that its north pole (N) is proximate to the side wall 30 of the body 26 and the south pole (S) is positioned away from the side wall 30 of the body 26. Magnet 42 is oppositely mounted such that its south pole (S) is proximate to the side wall 30 of the body 26 and the north pole (N) is positioned away from the side wall 30 of the body 26.

The exterior surface of the knob 38 has a plurality of indicia thereon, see FIG. 1. One half of the knob 38 has indicia thereon which designates regular coffee (REG) and specifies a batch size of small (S), medium (M) or large (L). The other half of the knob 38 has indicia thereon which designates decaffeinated coffee (DECAF) and specifies a batch size of small (S), medium (M) or large (L). As shown in the drawings for this embodiment, magnet 40 is positioned behind the medium (M) indicia of regular coffee, and magnet 42 is positioned behind the medium (M) indicia of decaffeinated coffee.

Sensors 44a, 44b, 44c are carried on the brewing substance dispenser 22, such as a coffee grinder, or on the beverage maker 24, such as a coffee brewer, for sensing the setting selected by the user on the funnel 20 when the funnel 20 is mounted on apparatus such as the brewing substance dispenser 22 or on the beverage maker 24. As shown in the drawings for this embodiment, these sensors 44a, 44b, 44c take the form of three (3) Hall effect sensors 44a, 44b, 44c imbedded in a front wall 46 at predetermined positions of the brewing substance dispenser 22 or the beverage maker 24. The setting on the knob 38 is then wirelessly communicated to the controller of the brewing substance dispenser 22 or to the beverage maker 24, depending on which apparatus the funnel 20 is mounted, to determine a pre-programmed dispensing time, volume or weight. These sensors 44a, 44b, 44c are coupled to a respective controller which controls the operation of the respective apparatus 22 or 24.

When the funnel 20 is mounted on the brewing substance dispenser 22 or the beverage maker 24, the upper portion 34 of the handle 28 which extends upwardly from the uppermost edge of the body 26 and the portion of the rotatable knob 38 thereon align with the front wall 46 of the brewing substance dispenser 22 or the beverage maker 24 and the magnet, for example and as shown in the drawings for this embodiment, magnet 40, aligns with one of the Hall effect sensors, for example and as shown in the drawings for this embodiment, Hall effect sensor 44b. The Hall effect sensor 44b senses the presence of the magnet 40 and an appropriate voltage is sent to the controller of the brewing substance dispenser 22 which instructs the brewing substance dispenser 22 to grind an appropriate amount of coffee of a particular coffee type or to the control circuity of the beverage maker 24 to brew an appropriate amount of coffee, depending on which component the funnel 20 is mounted.

FIG. 5 shows a chart which illustrates the voltages which would be sent to the controller depending on which setting is selected by the user. The user simply selects a setting by rotating the knob 38 until the desired batch size aligns with the arrow indicia 48 provided on the upper portion 34 of the handle 28, see FIG. 1. Detection of the magnet 40 or 42 by Hall effect sensor 44a indicates a large (L) batch of coffee has been selected; detection of the magnet 40 or 42 by Hall effect sensor 44b indicates a medium (M) batch of coffee has been selected; and detection of the magnet 40 or 42 by Hall effect sensor 44c indicates a small (S) batch of coffee has been selected. Detection of the north polarity of magnet 40 by one of Hall effect sensors 44a, 44b or 44c sends a positive going output voltage to the brewing substance dispenser 22 controller or to the beverage maker 24 controller, depending on which component the funnel 20 is mounted, to indicate that regular coffee has been selected; and detection of the south polarity of magnet 42 by one of Hall effect sensors 44a, 44b or 44c sends a negative going output voltage to the brewing substance dispenser 22 controller or to the beverage maker 24 controller, depending on which component the funnel 20 is mounted, to indicate that decaffeinated coffee has been selected. FIG. 6 illustrates a typical schematic diagram of the Hall effect sensor 44a, 44b, 44c circuitry using commonly available components. As shown in the drawings for this embodiment, the controller would be instructed to process a medium batch of regular coffee. The Hall effect sensor 44b, which senses a medium (M) batch size, would sense the north polarity of magnet 40, thereby indicating a regular coffee selection, and accordingly instruct the controller. If, for example, the knob 38 were set to decaffeinated coffee with a large (L) batch size, Hall effect sensor 44a, which senses a large (L) batch size, would sense the south polarity of magnet 42, thereby indicating a decaffeinated coffee selection, and accordingly instruct the controller.

In use, the user selects the beverage batch size and type by rotating the knob 38 until the associated indica aligns with the arrow indicia 48. The funnel 20 is first mounted on the brewing substance dispenser 22 for the appropriate dispensing of the beverage, such as by grinding, and then is physically transported to the beverage maker 24 for producing the beverage, such as by brewing. Therefore, information on batch size and the type of beverage is stored in the funnel 20 and is communicated to the brewing substance dispenser 22 and the beverage maker 24 when the funnel 20 is mounted on each. Because the information is carried with the funnel 20, there is no need for an interconnecting cable and therefore, the present system is wireless. The elimination of the cable permits the brewing substance dispenser 22 to serve any number of beverage makers 24. The operation is greatly simplified because only the setting on the knob 38 on the funnel 20 is set; there are no switch settings required on the brewing substance dispenser 22 and no switch settings required on the beverage maker 24.

Attention is directed to the second embodiment of the selector 38a. As shown in FIGS. 7–10, the selector 38a takes the form of a slide switch assembly 50 which has a pair of imbedded magnets 52, 54. The slide switch assembly 50 includes a housing 56 which is mounted on the upper portion 34 of the handle 28 and a slide member 58 which is mounted thereto.

The housing 56 includes a rear wall 60, opposite side walls 62 which extend perpendicularly to the rear wall 60, a top wall 64 which extends perpendicularly to the rear wall 60, and a front wall 66 which is parallel to the rear wall 60 and is connected to the side walls 62 and to the top wall 64. The front wall 66 has a cutout 68 therein in which a cover 70 is mounted by suitable means. The cover 70 covers a portion of the cutout 68, such that a slot 72 is provided between the bottom of the cover 70 and the front wall 66. Upper and lower rail portions 74, 76 protrude outwardly from a bottom section of the rear wall 60 and are perpendicular thereto such that the upper and lower rail portions 74, 76 protrude outwardly toward the cover 70. The upper and lower rail portions 74, 76 are spaced apart from each other and span substantially the entire width of the rear wall 60. The upper rail portion 74 has a plurality of notches 78 therein, see FIG. 10, which are spaced apart from each other, for reasons described herein. The housing 56 may be made of plastic or other suitable material. The upper and lower rail portions 74, 76 are preferably integrally formed with the rear wall 60, but may be formed separately and suitably attached thereto.

The slide member 58 includes an upper portion 80 which is positioned between the upper rail portion 74 and the top wall 64, a lower portion 82 which is positioned between the upper rail portion 74 and the lower rail portion 76 and sits against the upper rail portion 74 and the lower rail portion 76, a connecting portion 84 which connects the upper portion 80 to the lower portion 82 and which sits against the exterior surface of the upper rail portion 74, and a knob connection portion 86 which extends outwardly from the lower portion 82 and through the slot 72 between the cover 70 and the front wall 66. The upper portion 80 sits against the top wall 64 and is spaced from the upper rail portion 74 a predetermined distance. The slide member 58 has a predetermined width which is substantially less than the width of the cutout 68. The slide member 58 may be made of plastic or other suitable material and is preferably a one-piece construction.

A knob 88 is attached to the free end of the knob connection portion 86 by suitable means and overlaps the exterior surface of the cover 70. The knob 88 may be made of plastic or other suitable material.

A steel spring detent 90 is mounted to the upper portion 80 of the slide member 58 and is positioned between the upper portion 80 and the upper rail portion 74 of the housing 56. The spring detent 90 is generally V-shaped and the free ends are imbedded within the upper portion 80 of the slide member 58. The point of spring detent 90 sits against the upper surface of the upper rail portion 74. As the slide member 58 is moved along the slot 72 relative to the housing 56, the spring detent 90 flexes and the point slides across the top surface of the upper rail portion 74. The point of the spring detent 90 will move into and out of the notches 78 as the slide member 58 is moved across the upper rail portion 74 so as to provide a "feel" to the user that the slide member 58 has been correctly positioned along the length of the slot 72.

The pair of magnets 52, 54 are imbedded within the upper portion 80 of the slide member 58 and are proximate to the rear wall 60. The magnets 52, 54 are spaced apart from each other a predetermined distance. Magnet 52 is mounted such that its south pole is proximate to the rear wall 60 and thus proximate to the side wall 30 of the funnel 20, and the north pole is positioned away from the rear wall 60 and thus away from the side wall 30 of the funnel 20. Magnet 54 is oppositely mounted such that its north pole is proximate to the rear wall 60 and thus proximate to the side wall 30 of the funnel 20, and the south pole is positioned away from the rear wall 60 and thus away from the side wall 30 of the funnel 20.

Figure 7:
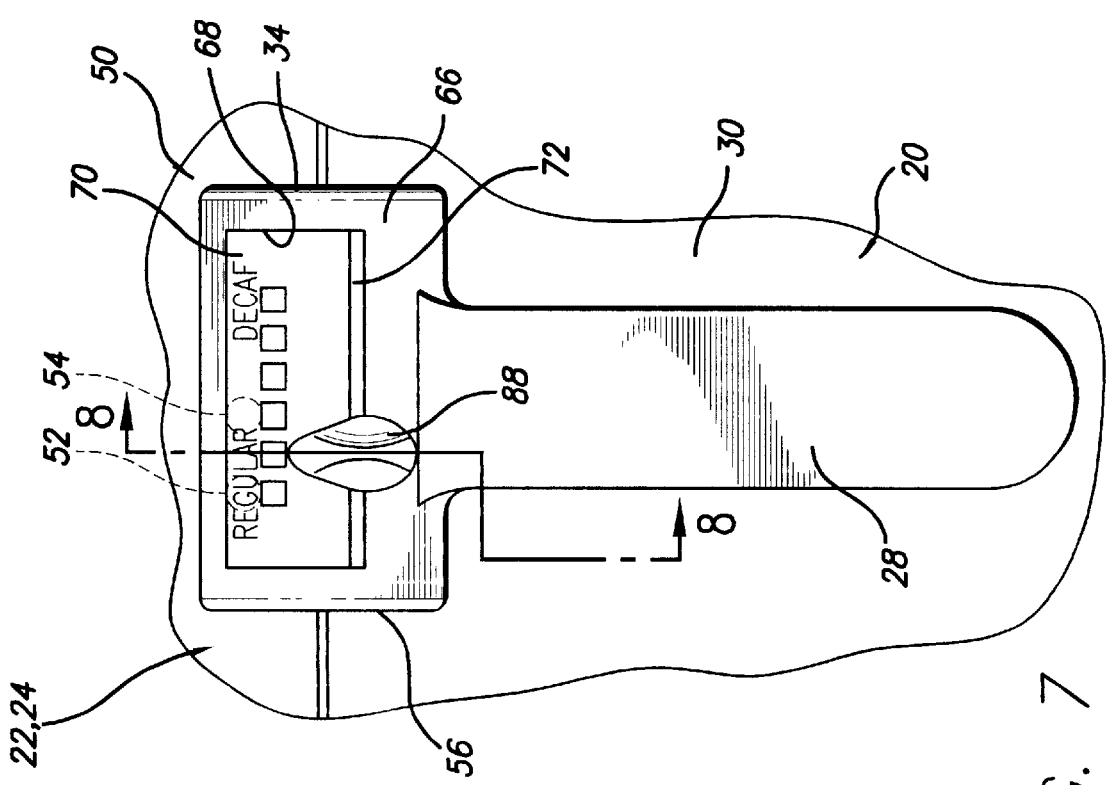
FIG. 7 is a side elevational view of a portion of a funnel which incorporates the features of a second embodiment of the invention and showing a portion of a machine, such as a brewing substance dispenser or coffee grinder, or a beverage maker or coffee brewer, to which the funnel is attached in side elevation.

The cover 70 has a plurality of indicia thereon, see FIG. 7. One half of the cover 70 has indicia thereon which designates regular coffee (REGULAR) and specifies a batch size of small (by showing a box having less than half darkened), medium (by showing a box being half darkened) or large (by showing a box having more than half darkened). The other half of the cover 70 has indicia thereon which designates decaffeinated coffee (DECAF) and specifies a batch size of small (by showing a box having less than half darkened), medium (by showing a box being half darkened) or large (by showing a box having more than half darkened). As shown in FIGS. 7–10 of this embodiment, the knob 88 is positioned on a medium batch of regular coffee. This results in magnet 52 being positioned behind the small indicia of regular coffee, magnet 54 being positioned behind the large indicia of regular coffee, and there is no magnet positioned behind the medium indicia of regular coffee.

Four sensors 92a, 92b, 92c, 92d are carried on the brewing substance dispenser 22 or on the beverage maker 24 for sensing the setting selected by the user on the funnel 20 when the funnel 20 is mounted thereon. Sensor 92a is sensor #1; sensor 92b is sensor #2; sensor 92c is sensor #3; and sensor 92d is sensor #4. As shown in the drawings for this embodiment, these sensors 92a, 92b, 92c, 92d take the form of Hall effect sensors imbedded in the front wall 46 of the brewing substance dispenser 22 or the beverage maker 24 at predetermined positions thereof. Preferably, the centers of the sensors 92a, 92b, 92c, 92d are spaced 0.25" apart from each other and the centers of the magnets 52, 54 are spaced 0.5" apart from each other. The setting on the knob 88 is then wirelessly communicated to the controller of the brewing substance dispenser 22 or to the beverage maker 24, depending on which apparatus the funnel 20 is mounted, to determine a pre-programmed dispensing time, volume or weight. These sensors 92a, 92b, 92c, 92d are coupled to a respective controller which controls the operation of the respective apparatus 22 or 24.

When the funnel 20 is mounted on the brewing substance dispenser 22 or the beverage maker 24, the slide switch assembly 50 aligns with the front wall 46 of the brewing substance dispenser 22 or the beverage maker 24. Depending on the type of beverage and the batch size selected by sliding the slide member 58 along the slot 72, one magnet, for example magnet 54, can align with one of the Hall effect sensors, for example Hall effect sensor 92b. This setting is shown in FIGS. 7–10. The Hall effect sensor 92b senses the presence of the magnet 54 and an appropriate voltage is sent to the controller of the brewing substance dispenser 22 which instructs the brewing substance dispenser 22 to dispense an appropriate amount of beverage of a particular type, such as by grinding, or to the controller of the beverage maker 24 to produce an appropriate amount of beverage, such as by brewing, depending on which component the funnel 20 is mounted. Again, depending on the type of beverage and the batch size selected by sliding the slide member 58 along the slot 72, one magnet 54 can align with one of the Hall effect sensors, for example Hall effect sensor 92c, and the other magnet 52 can align with another one of the Hall effect sensors, for example Hall effect sensor 92a. The Hall effect sensors 92c, 92a sense the presence of the magnets 54, 52 and an appropriate voltage is sent to the controller of the brewing substance dispenser 22 which instructs the brewing substance dispenser 22 to dispense an appropriate amount of coffee of a particular beverage type or to the controller of the beverage maker 24 to produce an appropriate amount of beverage, depending on which component the funnel 20 is mounted.

FIG. 11 shows a chart which illustrates the voltages from each sensor 92a, 92b, 92c, 92d which would be sent to the controller depending on which setting is selected by the user. The user simply selects a setting by sliding the slide member 58 until the point on the knob 88 aligns with the desired batch size and type of coffee. Detection of the south polarity of magnet 54 by Hall effect sensor 92a, with magnet 52 not being detected, indicates a small batch of regular coffee has been selected. Detection of the south polarity of magnet 54 by Hall effect sensor 92b, with magnet 52 not being detected, indicates a medium batch of regular coffee has been selected. Detection of the south polarity of magnet 54 by Hall effect sensor 92c and detection of the north polarity of magnet 52 by Hall effect sensor 92a indicates a large batch of regular coffee has been selected. Detection of the south polarity of magnet 54 by Hall effect sensor 92d and detection of the north polarity of magnet 52 by Hall effect sensor 92b indicates a small batch of decaffeinated coffee has been selected. Detection of the north polarity of magnet 52 by Hall effect sensor 92c, with magnet 54 not being detected, indicates a medium batch of decaffeinated coffee has been selected. Detection of the north polarity of magnet 52 by Hall effect sensor 92d, with magnet 54 not being detected, indicates a large batch of decaffeinated coffee has been selected. Detection of the north polarity of magnet 52 by the Hall effect sensors 92a, 92b, 92c, 92d sends a negative going output voltage to the brewing substance dispenser 22 controller or to the beverage maker 24 controller, depending on which component the funnel 20 is mounted; and detection of the south polarity of magnet 54 by the Hall effect sensors 92a, 92b, 92c, 92d sends a positive going output voltage to the brewing substance dispenser 22 controller or to the beverage maker 24 controller, depending on which component the funnel 20 is mounted.

FIG. 12 illustrates a typical schematic diagram of the Hall effect sensor 92a, 92b, 92c, 92d circuitry using commonly available components. As shown in the drawings for this embodiment, the controller would be instructed to process a medium batch of regular coffee. The Hall effect sensor 92b would sense the south polarity of magnet 54 and send a positive voltage to the controller, and Hall effect sensors 92a, 92b, 92c would not sense magnet 52. The controller would then determine, based on this information, that a medium batch of regular coffee has been selected.

If, for example, the slide member 58 were set to select decaffeinated coffee with a small batch size, Hall effect sensor 92d would sense the south polarity of magnet 54 and send a positive voltage to the controller, and Hall effect sensor 92b would sense the north polarity of magnet 52 and send a negative voltage to the controller, and Hall effect sensors 92a, 92c would not sense any magnets. The controller would then determine, based on this combination, that a small batch of decaffeinated coffee has been selected.

If, for example, the slide member 58 were set to select regular coffee with a large batch size, Hall effect sensor 92c would sense the south polarity of magnet 54 and send a positive voltage to the controller, Hall effect sensor 92a would sense the north polarity of magnet 52 and send a negative voltage to the controller, and Hall effect sensors 92b, 92d would not sense any magnets. The controller would then determine, based on this combination, that a large batch of regular coffee has been selected.

FIGS. 13A and 13B show a flow chart illustrating the detection of a large batch of regular coffee. DA in the flow chart represents the programmable number of analog-to-digital converter counts the sensor must be from the center threshold to make the determination as to whether a north or south polarity is being detected. DB in the flow chart represents the programmable number of analog-to-digital converter counts the sensor must be from the adjacent sensor. ST1 represents the static threshold for sensor 92a; ST2 represents the static threshold for sensor 92b; ST3 represents the static threshold for sensor 92c; and ST4 represents the static threshold for sensor 92d. In addition, the flow chart provides logic which senses the position of the magnets 52, 54 relative to the sensors 92a, 92b, 92c, 92d such that if the knob 88 is positioned between two settings, for example, the knob 88 is positioned between a medium batch of regular coffee and a large batch of regular coffee, the software determines which is the appropriate setting. The software determines the position of the magnets 52, 54 relative to the sensors 92a, 92b, 92c, 92d and determines which sensor the magnets are closest to in order to determine the appropriate setting.

In use, the user selects the beverage batch size and type by sliding the slide member 58 along the slot 72 until the associated indica aligns with the point on the knob 88. The funnel 20 is first mounted on the brewing substance dispenser 22 for the appropriate dispensing, such as by grinding, and then is physically transported to the beverage maker 24 for producing the beverage, such as by brewing. Therefore, information on batch size and the type of beverage is stored in the funnel 20 and is communicated to the brewing substance dispenser 22 and the beverage maker 24 when the funnel 20 is mounted on each. Because the information is carried with the funnel 20, there is no need for an interconnecting cable and therefore, the present system is wireless. The elimination of the cable permits the brewing substance dispenser 22 to serve any number of beverage makers 24.

The operation is greatly simplified because only the setting on the knob 88 on the funnel 20 is set; there are no switch settings required on the brewing substance dispenser 22 and no switch settings required on the beverage maker 24.

While the funnel 20 is described as having a six position rotary knob 38 or is described as having a slide switch assembly 50, it is to be understood that the number of positions and the switching mechanism can be varied depending on the application, styling requirements, and the like. For example, a push button arrangement could be used.

The sensors 44a, 44b, 44c; 92a, 92b, 92c, 92d provided in the brewing substance dispenser 22 and the beverage maker 24 can take a variety of forms. The sensors 44a, 44b, 44c; 92a, 92b, 92c, 92d can be effected by any of several different well-known methods of proximity detection, including magnetic, eddy current, capacitance, conductance, photoelectric, inductive, electromagnetic and infrared. In addition, the means 40, 42; 52, 54 on the funnel 20 used to convey the information to the brewing substance dispenser 22 and the beverage maker 24, which is shown in the drawings and is described herein as magnets 40, 42; 52, 54, can take a variety of forms.

The brewing substance dispenser 22 used in the present invention is preferably a dual hopper system, which is known in the art, which has regular coffee beans in a first hopper and decaffeinated coffee beans in a second hopper. Depending on which coffee type is selected and the desired batch size, the appropriate hopper is accessed by opening a respective gate provided at the bottom of the hopper to release the appropriate beans and the appropriate amount of beans to a common grinding unit. While a dual hopper brewing substance dispenser 22 is preferably used in the present invention, it is understood that a single hopper brewing substance dispenser could be used. In this case, a user would simply select a batch size as only one type of coffee would be available.

In addition, while a separate brewing substance dispenser 22 and a separate beverage maker 24 are preferably used in the present invention, a combined brewing substance dispenser and beverage maker unit can be used with the present invention. In this situation, the funnel 20 is mounted to the combined unit and is not removed therefrom until after the complete grinding and brewing cycle is completed. The brewing substance dispenser can include a dual hopper or single hopper.

Attention is now invited to FIGS. 14–17. The funnel 120, 120a includes a conductive body 126, 126a having a plastic handle 128, 128a mounted thereon. The body 126, 126a is formed from stainless steel or other suitable conductive material. The handle 128, 128a is mounted on the body 126, 126a by conventional means. The body 126, 126a has a side wall 130, 130a and a bottom wall 132, 132a. The bottom wall 132, 132a has an discharge aperture 133, 133a therethrough. The upper end of the body 126, 126a is open.

A plastic housing 134, 134a is mounted on the uppermost end of the handle 128, 128a and extends upwardly therefrom and from the uppermost end of the body 126, 126a. The housing 134, 134a does not overlap the open end of the body 126, 126a. A memory device 136, 136a, such as a semiconductor memory chip, is attached to or implanted into the housing 134, 134a.

Figure 14:
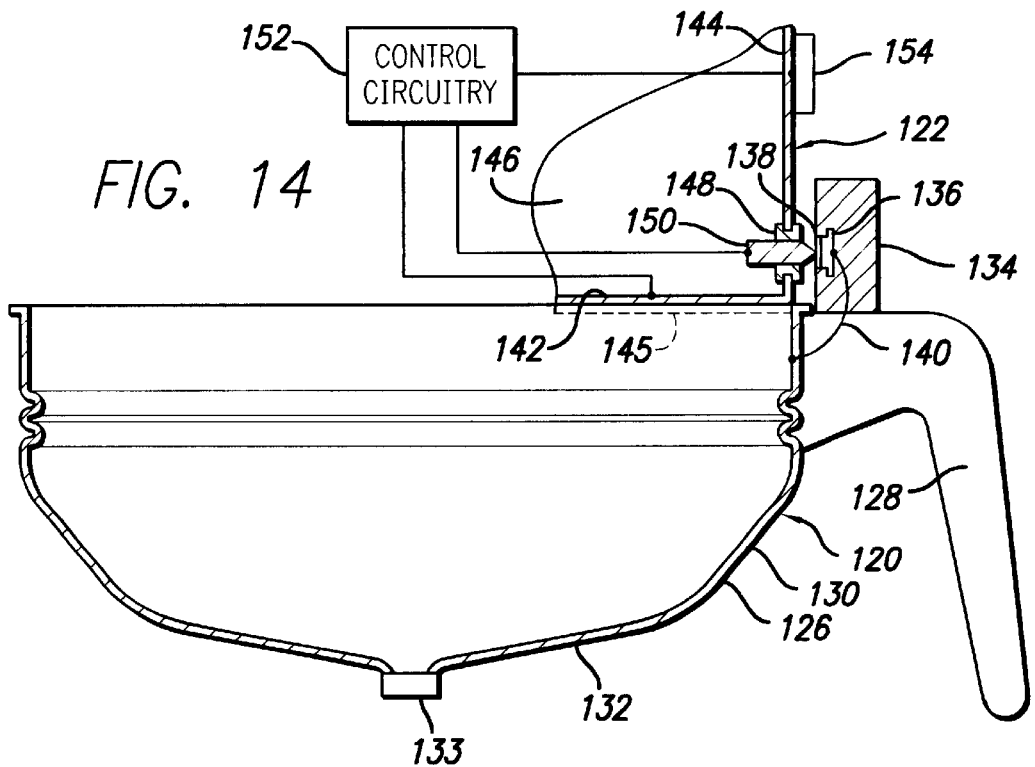
FIG. 14 is a partial fragmentary side elevational view of a funnel, with a fragmentary portion of the funnel being shown in cross-section, and a cross-sectional view of a portion of a brewing substance dispenser, such as a coffee grinder, to which the funnel is attached which incorporates the features of a third embodiment of the invention.
Figure 15:
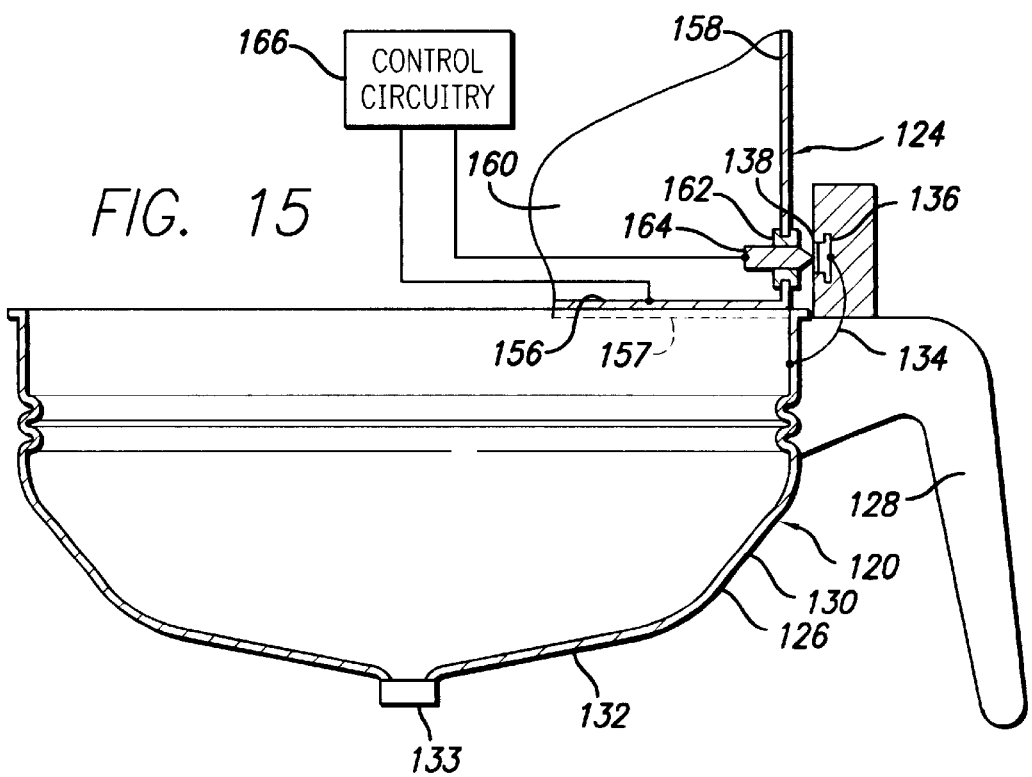
FIG. 15 is a partial fragmentary side elevational view of the funnel of FIG. 14, with a fragmentary portion of the funnel being shown in cross-section, and a cross-sectional view of a portion of a beverage maker, such as a coffee brewer, to which the funnel is attached which incorporates the features of a third embodiment of the invention.

Attention is invited to the third, and preferred, embodiment of the present invention as shown in FIGS. 14 and 15.

The memory device 136 is implanted in the housing 134 such that a face 138 of the memory device 136 is exposed on the side of the housing 134 proximate to the body 126 of the funnel 120. The memory device 136 is electrically coupled to the metal body 126 of the funnel 120 by a ground strip 140. The ground strip 140 extends through the housing 134 and through an upper portion of the handle 128. An example of a suitable memory device 136 is an Electrically Erasable Programmable Read Only Memory (EEPROM) sold under the trademark "iButton™" and manufactured by Dallas Semiconductor. The "iButton™" EEPROM is a memory chip packaged in a sealed can. The "iButton™" EEPROM carries power and data on a single wire plus a ground return.

As shown in FIG. 14, the brewing substance dispenser 122, such as coffee grinder, has a metal bottom wall 142, a metal front wall 144, opposite side walls 146 (only one of which is shown), and a top wall (not shown). A pair of conductive funnel mounting rails 145 (only one of which is shown in phantom line) are provided on the bottom wall 142. The rails 145 are formed from stainless steel or other suitable conductive material. The front wall 144 has an aperture provided therethrough. An insulator 148, formed of suitable non-conductive material, is mounted within the aperture. The insulator 148 has an aperture through its center. A metal contact 150 is mounted within the aperture through the insulator 148 and is secured thereto by suitable means. A portion of the metal contact 150 extends outwardly from the front wall 144. Control circuitry 152 is provided within the brewing substance dispenser 122 and is coupled to the metal contact 150 and to the bottom wall 156 of the brewing substance dispenser 122. The control circuitry 152 includes a memory therein. A user interface 154, which can take many forms such as depressible buttons, a touch pad, movable switches, and the like, is provided on the front wall 144. The user interface 154 is coupled to the control circuitry 152. Beverage recipes, such as recipes for coffee, are stored in the memory of the control circuitry 152. Each recipe includes information on beverage type, batch size, percent bypass water, pulse brew initial on-time, pulse brew off-time, and pulse brew remaining on-times.

As shown in FIG. 15, the beverage maker 124, such as a coffee brewer, has a metal bottom wall 156, a metal front wall 158, opposite side walls 160 (only one of which is shown), and a top wall (not shown). A pair of conductive funnel mounting rails 157 (only one of which is shown in phantom line) are provided on the bottom wall 156. The rails 157 are formed from stainless steel or other suitable conductive material. The front wall 158 has an aperture provided therethrough. An insulator 162, formed of a suitable non-conductive material, is mounted within the aperture. The insulator 162 has an aperture through its center. A metal contact 164 is mounted within the aperture through the insulator 162 and is secured thereto by suitable means. A portion of the metal contact 164 extends outwardly from the front wall 158. Control circuitry 166 is provided within the beverage maker 124 and is coupled to the metal contact 164 and to the bottom wall 156 of the beverage maker 124. The control circuitry 166 includes a memory therein.

In use, the user selects the appropriate recipe by using the user interface 154 on the brewing substance dispenser 122. This information is transmitted to the control circuitry 152. The funnel 120 is mounted on the rails 145 of the brewing substance dispenser 122 such that the upper end of the body 126 contacts the rails 145, the housing 134 is proximate to the front wall 144 and the body 126 is underneath the bottom wall 142. An upper end of the body 126 may contact the bottom wall 142. The memory device 136 within the housing 134 is positioned such that it is proximate to and contacts the portion of the metal contact 150 which protrudes outwardly from the front wall 144. The metal-to-metal contact between the funnel 120 and the brewing substance dispenser 122, provided as a result of the metal body 126 of the funnel 120 contacting the metal rails 145 of the brewing substance dispenser 122, provides the ground return to the control circuitry 152. The control circuitry 152 instructs the appropriate components of the brewing substance dispenser 22 to dispense the appropriate amount and type of beverage, such as by grinding an appropriate amount and type of coffee. As the brewing substance dispenser 122 dispenses beverage into the funnel 120, the control circuitry 152 in the brewing substance dispenser 122 transmits recipe information to the memory device 136 in the funnel 120 via the contact 150.

Thereafter, the funnel 120 is removed from the brewing substance dispenser 122 and transported to the beverage maker 124. The funnel 120 is mounted on the rails 157 of the beverage maker 124 such that the upper end of the body 126 contacts the rails 157, the housing 134 is proximate to the front wall 158 and the body 126 is underneath the bottom wall 156. An upper end of the body 126 may contact the bottom wall 156. The memory device 136 is positioned such that it is proximate to and contacts the portion of the metal contact 164 which protrudes outwardly from the front wall 158. The information stored in the memory device 136 of the funnel 120 regarding beverage batch size and/or type is read by the control circuitry 166 of the beverage maker 124. At this point, depending on user preference, the remaining information is read either from the memory device 136 in the funnel 120 or from internal beverage maker memory. The metal-to-metal contact between the funnel 120 and the rails 157 of the beverage maker 124, provided as a result of the metal body 126 of the funnel 120 contacting the metal rails 157 of the beverage maker 124, provides the ground return to the control circuitry 166. The control circuitry 166 instructs the appropriate components of the beverage maker 124 to produce the desired beverage, such as by brewing the coffee.

Attention is invited to the fourth embodiment of the present invention as shown in FIGS. 16 and 17.

The memory device 136a is implanted in the housing 134a such that it is encapsulated within the housing 134a. An example of a suitable memory device 136a is an RFID device manufactured by Temic. This type of device transfers information by electromagnetic coupling and does not require an electrical contact to transfer information.

As shown in FIG. 16, the brewing substance dispenser 122a, such as coffee grinder, has a metal bottom wall 168, a metal front wall 170, opposite side walls 172 (only one of which is shown) and a top wall (not shown). A pair of funnel mounting rails 171 (only one of which is shown in phantom line) are provided on the bottom wall 170. The rails 171 may be formed from stainless steel or other suitable conductive material. The front wall 170 has an aperture provided therethrough. A plastic insert 174, which is transparent to electromagnetic energy, is mounted within the aperture. A reader integrated circuit 176 having a reader coil 178 is mounted within the brewing substance dispenser 122a. The reader coil 178 is proximate to the plastic insert 174. Control circuitry 180 is provided within the brewing substance dispenser 122a and is coupled to the reader integrated circuit 176. The control circuitry 180 includes a memory therein. A user interface 182, which can take many forms such as depressible buttons, a touch pad, movable switches, and the like, is provided on the front wall 170. The user interface 182 is coupled to the control circuitry 180. Beverage recipes, such as coffee recipes, are stored in the memory of the control circuitry 180. Each recipe includes information on beverage type, batch size, percent bypass water, pulse brew initial on-time, pulse brew off-time, and pulse brew remaining on-times.

As shown in FIG. 17, the beverage maker 124a, such as a coffee brewer, has a metal bottom wall 184, a metal front wall 186, opposite side walls 188 (only one of which is shown) and a top wall (not shown). A pair of funnel mounting rails 185 (only one of which is shown in phantom line) are provided on the bottom wall 184. The rails 185 may be formed from stainless steel or other suitable conductive material. The front wall 186 has an aperture provided therethrough. A plastic insert 190, which is transparent to electromagnetic energy, is mounted within the aperture. A reader integrated circuit 192 having a reader coil 194 is mounted within the beverage maker 124a. The reader coil 194 is proximate to the plastic insert 190. Control circuitry 196 is provided within the beverage maker 124a and is coupled to the reader integrated circuit 192. The control circuitry 196 includes a memory therein.

In use, the user selects the appropriate recipe by using the user interface 182 on the brewing substance dispenser 122a.

This information is transmitted to the control circuitry 180. The funnel 120*a* is mounted on the brewing substance dispenser 122*a* such that the housing 134*a* is proximate to the front wall 170 and the body 126*a* is underneath the bottom wall 168 and an upper end of the body 126*a* contacts the bottom wall 168. The memory device 136*a* is positioned such that it is proximate to the plastic insert 174 in the front wall 170 of the brewing substance dispenser 122*a*. The control circuitry 180 instructs the appropriate components of the brewing substance dispenser 122*a* to dispense the appropriate amount and type of beverage, such as by grinding the appropriate amount and type of coffee. As the brewing substance dispenser 122*a* dispenses beverage into the funnel 120*a*, the control circuitry 180 in the brewing substance dispenser 122*a* transmits recipe information to the memory device 136*a* in the funnel 120*a* via the reader integrated circuit 176 and the reader coil 178.

Thereafter, the funnel 120*a* is removed from the brewing substance dispenser 122*a* and transported to the beverage maker 124*a*. The funnel 120*a* is mounted on the beverage maker 124*a* such that the housing 134*a* is proximate to the front wall 186 and the body 126*a* is underneath the bottom wall 184 and an upper end of the body 126*a* contacts the bottom wall 184. The memory device 136*a* is positioned such that it is proximate to the plastic insert 190. The information stored in the memory device 136*a* of the funnel 120*a* regarding beverage batch size and/or type is read by the control circuitry 196 of the beverage maker 124*a*. At this point, depending on user preference, the remaining information is read either from the memory device 136*a* in the funnel 120*a* or from internal beverage maker memory. The control circuitry 196 instructs the appropriate components of the beverage maker 124*a* to produce the desired beverage, such as by brewing coffee.

Some restaurants or institutions may want the recipe stored only in the memory device 136, 136*a* in the funnel 120, 120*a* so that a corporate office can make a change throughout their entire organization by sending preprogrammed memory devices 136, 136*a* to all of their stores. Other customers may want the flexibility to modify the recipe at the store level. If the latter option is desired, the recipes can be stored in the beverage maker memory so that the recipes can be easily changed using controls within the beverage maker 124, 124*a* itself. It is possible to have a combination of the two options such that some "protected" recipes are stored in the memory device 136, 136*a* of the funnel 120, 120*a* which the users cannot modify and some "changeable" recipes are stored in the beverage maker memory which can be changed by the user.

Because the information is carried with the funnel 120, 120*a* there is no need for an interconnecting cable. The elimination of the cable permits the brewing substance dispenser 122, 122*a* to serve any number of beverage makers 124, 124*a*. The operation is greatly simplified because only the setting on the brewing substance dispenser 122, 122*a* is set; there are no switch settings required on the beverage maker 124, 124*a* or the funnel 120, 120*a*.

While specific components are shown and described for use in transmitting information between the brewing substance dispenser 122, 122*a* and the funnel 120, 120*a*, and for transmitting information between the beverage maker 124, 124*a* and the funnel 120, 120*a*, and for storing the information within the funnel 120, 120*a*, it is to be understood other components are within the scope of the invention so long as a cable is not needed to connect the brewing substance dispenser 122, 122*a* and the funnel 120, 120*a* or to connect the beverage maker 124, 124*a* and the funnel 120, 120*a*.

The brewing substance dispenser 122, 122*a* used in the present invention is preferably a dual hopper system, which is known in the art, which has regular coffee beans in a first hopper and decaffeinated coffee beans in a second hopper, or two different flavored coffees in the respective hoppers. Depending on which coffee type is selected and the desired batch size, the appropriate hopper is accessed by opening a respective gate provided at the bottom of the hopper to release the appropriate beans and the appropriate amount of beans to a common grinding unit. While a dual hopper brewing substance dispenser 122, 122*a* is preferably used in the present invention, it is understood that a single hopper brewing substance dispenser could be used.

In addition, while the present invention is described with respect to grinding and brewing coffee, it is within the scope of the invention that this system and method can be used to brew, dilute, reconstitute, mix and the like, coffee, tea, powdered beverages and the like.

While preferred embodiments of the present invention are shown and described, it is envisioned that those skilled in the art may devise various modifications of the present invention without departing from the spirit and scope of the appended claims.

The invention claimed is:

1. A method of producing a beverage comprising the steps of:

providing a funnel having a memory device therein, said memory device having information regarding a recipe for producing a beverage therein;

providing a beverage maker having means for reading said memory device of said providing said beverage maker with a component for controllably delivering water to said funnel;

providing a brewing substance in said funnel for producing a beverage;

mounting said funnel on said beverage maker, said means reading said memory device such that information regarding the recipe for producing a beverage is transmitted to said beverage maker; and combining the brewing substance with water in said funnel based on the information regarding the recipe to produce a beverage.

2. The method as defined in claim 1, wherein said means and said memory device are in wireless communication with each other.

3. The method as defined in claim 1, wherein said means comprises a contact which extends outwardly from said beverage maker and is coupleable with said memory device when said funnel is mounted on said beverage maker.

4. The method as defined in claim 3, wherein an electrical connection is solely formed between said contact, said memory device, a ground strip coupled between said memory device and a body of said funnel, and said beverage maker.

5. The method as defined in claim 1, wherein said means comprises integrated circuit means and further including an insert in said beverage maker through which information is transmitted from said memory device in said funnel to said integrated circuit means.

6. The method as defined in claim 1, wherein said memory device is an Electrically erasable programmable read only memory chip.

7. The method as defined in claim 1, wherein said memory device is an RFID.

8. A beverage maker and a funnel combination comprising:

said funnel comprising a body and a memory device therein said memory device having information regarding a recipe for producing a beverage therein; and said beverage maker comprising a housing and means for reading said memory device of said funnel, said means and said memory deice capable of being in communication with each other such that information regarding the recipe for producing a beverage is transmitted to said beverage maker.

9. The combination as defined in claim 8, wherein said means and said memory device are in wireless communication with each other.

10. The combination as defined in claim 8, wherein said means comprises a contact which extends outwardly from said housing and is coupleable with said memory device when said funnel is mounted on said beverage maker.

11. The combination as defined in claim 10, wherein when said funnel is mounted on said beverage maker, an electrical connection is solely formed between said contact, said memory device, a ground strip coupled between said memory device and a body of said funnel and said beverage maker.

12. The combination as defined in claim 8, wherein said means comprises integrated circuit means and further including an insert on said housing through which information is transmitted from said memory device in said funnel to said integrated circuit means.

13. The combination as defined in claim 8, wherein said memory device is an electrically erasable programmable read only memory chip.

14. The combination as defined in claim 8, wherein said memory device is an RFID.

* * * * *